United States Patent [19]

Sakariassen

[11] Patent Number: 5,032,912
[45] Date of Patent: Jul. 16, 1991

[54] SELF-CONTAINED MONOCSCOPIC AND STEREOSCOPIC TELEVISION OR MONITOR DEVICE

[76] Inventor: Arnvid Sakariassen, Holmenkollun. 74C, N-0391 Oslo 3, Norway

[21] Appl. No.: 441,387

[22] Filed: Nov. 17, 1989

Related U.S. Application Data

[63] Continuation-in-part of Ser. No. 61,686, Jun. 12, 1987, which is a continuation-in-part of Ser. No. 616,223, May 25, 1984, abandoned.

[51] Int. Cl.⁵ ............................................. H04N 13/04
[52] U.S. Cl. .................................... 358/88; 358/248; 358/91
[58] Field of Search ...................... 358/88, 89, 91, 92, 358/241, 248, 254

[56] References Cited

U.S. PATENT DOCUMENTS

| | | | |
|---|---|---|---|
| 2,832,821 | 4/1958 | Dumont | 358/142 X |
| 2,845,618 | 7/1958 | Huffman | 358/88 |
| 3,559,555 | 12/1985 | Schoolman | 358/88 |
| 3,784,738 | 1/1974 | Natter | 358/88 X |
| 4,535,354 | 8/1985 | Rickert | 358/88 |
| 4,587,567 | 5/1986 | Yamamori et al. | 358/248 |
| 4,647,966 | 3/1987 | Phillips et al. | 358/88 |

FOREIGN PATENT DOCUMENTS

| | | | |
|---|---|---|---|
| 0172110 | 2/1986 | European Pat. Off. | 358/89 |
| 3006749 | 4/1981 | Fed. Rep. of Germany | 358/88 |
| 2113058 | 7/1983 | United Kingdom | 358/88 |

Primary Examiner—Victor R. Kostak
Attorney, Agent, or Firm—Pasquale A. Razzano

[57] ABSTRACT

A television device for the display of monoscopic and/or stereoscopic images in pairs, possibly along with sound, comprising a receiver unit, including highly integrated circuits for the reception and/or generation and distribution of video signals corresponding to said images, possibly along with sound, and a display unit, including possible optical means, adapted to produce one image for each eye of a human being, said display unit being assembled and mounted in a frame adapted to be placed in sufficiently close proximity to the eyes to enable separate display of each image for each eye. The receiver unit is incorporated together with said display unit in the frame.

1 Claim, 1 Drawing Sheet

SELF-CONTAINED MONOCSCOPIC AND STEREOSCOPIC TELEVISION OR MONITOR DEVICE

This application is a continuation-in-part application of U.S. patent application No. 061,686, filed June 12, 1987, which is a continuation-in-part application of U.S. patent application Ser. No. 616,223, filed May 25, 1984, now abandoned.

BACKGROUND OF THE INVENTION

1. Field of the Invention

The invention relates to a television device for individual use of a human being for the reception and reproduction of monoscopic and/or stereoscopic images, possible along with sound.

The images, possibly along with sound, may be received from a television transmitter or, for instance, be obtained from a local transmitter, a playback device, or image generating equipment.

2. Description of the Related Art

In the related art of television or monitor systems for individual use (see e.g. U.S. Pat. No. 3,670,097 and U.S. Pat. No. 4,310,849), the display of viewing part of the system including suitable optical means is assembled and mounted in a separate body or frame adapted to be placed in sufficiently close proximity to the eyes of the observer to enable separate display of an image for each eye. When observing the images, the frame can either be grasped by hand or worn around the head, or be mounted or placed on a stand or table. The frame can be of various types and design.

However, in the related art, inconvenient interconnecting cables and additional equipment remotely placed outside the frame which house the main body or the main receiver unit of the television or monitor device are required in the known systems for individual use to achieve a complete television or monitor device. The main receiver unit in these devices includes the circuits for the reception (tuner part) and/or building up (synchronizing/control, etc.) and distribution (video part) of the images. Separate units are thus required for the reproduction means, on the one hand, and the display or viewing means, on the other hand. Thus, all known prior art publications teach the traditional understanding that the main body or the main receiver unit for receiving, building up and distribution of the video signals is to be remotely placed in relation to the human eyes.

The only way suggested in prior art devises of this kind, to enable separate display of one image for each eye, has therefore been to take out, from the traditional remotely placed complete television or monitor receiver, the display or viewing part (tubes and/or optical means) to make a separate body thereof and transmit the two images from the main receiver unit to the display or viewing part by using interconnecting cables.

SUMMARY OF THE INVENTION

It is generally an object of the present invention to provide a television device for the reception and reproduction of monoscopic and/or stereoscopic images having image reproduction means and display means which are assembled and mounted in one and the same frame adapted to be placed in close proximity to the eyes of a human being.

It is also an object of the present invention to provide a television device which is assembled and mounted in one and the same frame adapted to be placed in close proximity to the eyes including a sound reproduction means integrated with the image reproduction means.

It is further an object of the present invention to provide a television device mounted in one and the same frame adapted to be placed in close proximity to the eyes which may be powered by solar battery means.

It is still further an object of the present invention to provide a television device mounted in one and the same frame adapted to be placed in close proximity to the eyes wherein the image reproduction means are adapted to be connected by cable to a local transmitter, a playback device, or image generating equipment.

It is yet a further object of the present invention to provide a television device mounted in one and the same frame in close proximity to the eyes wherein the image reproduction means includes highly integrated circuits for the reception, building up and distribution of images.

It is still a further object of the present invention to provide a complete television or monitor device for individual use for the reception and reproduction of monoscopic and/or stereoscopic images while avoiding additional equipment and interconnecting cables outside the frame.

Various other objects, advantages and features of the present invention will become readily apparent from the ensuing detailed description, and the novel features will be particularly pointed out in the appended claims.

BRIEF DESCRIPTION OF THE DRAWINGS

The following detailed description, given by way of example but not intended to limit the invention solely to the specific embodiments described, may best be understood in conjunction with the accompanying drawings in which.

DETAILED DESCRIPTION OF PREFERRED EMBODIMENTS OF THE INVENTION

According to the present invention, a complete and self-contained television device or complete video monitor is placed, mounted or fixed in one and the same frame adapted to be placed in close proximity to the eyes. Thus, additional equipment and interconnecting cables outside the frame can be dispensed with. This makes the device more user friendly, more flexible in use outdoors as well as indoors, and opens the way for many new application possibilities.

According to the present invention, this is brought about by a frame having two display units incorporated therein, with a receiver unit, including highly integrated circuits for the reception (tuner part), building up (synchronizing/control etc.) and distribution (video part) of video signals to provide one image for each display unit, i.e., one image for the left eye and one image for the right eye. These circuits and display units may all be of known construction and arrangement as would be apparent to those skilled in the television art.

Integrated chip M51345FP available from, e.g. Mitsubishi Electric Corporation of Japan may be incorporated within a self-contained television device of the present invention. This chip handles audio or video signal detection when connected to an integrated circuit chip for processing video and chroma signals, which, when using the PAL System, would be the chip designated M51403FP or, when using the NTSC System, would be the chip designated M51405FP. Such chips allow the use of a miniature battery which may be readily provided in the frame, as the operating voltage of the circuits are 4 to 5V and power consumption of each device is between 40 and 80 mW. For technical details of these chips, reference is made to the publication Mitsubishi Denki Giho, "A Low-Power Video-Processing IC for Pocket Color TVs with LCD panels," Vol. 61, No. 9, pp 56-9 (1987), the disclosure of which is incorporated herein by reference.

The images are in pairs, i.e., two identical monoscopic images or two slightly displaced monoscopic (stereoscopic) images of the same object. When receiving monoscopic images, the same monoscopic image is transmitted to both display units by allowing the highly integrated circuits to receive, build up and distribute the same monoscopic image to each of its corresponding display units, or, for instance, by allowing one of the video parts to transmit the same monoscopic image to both display units. The image may be either in color or in black-and-white.

Figure 1:
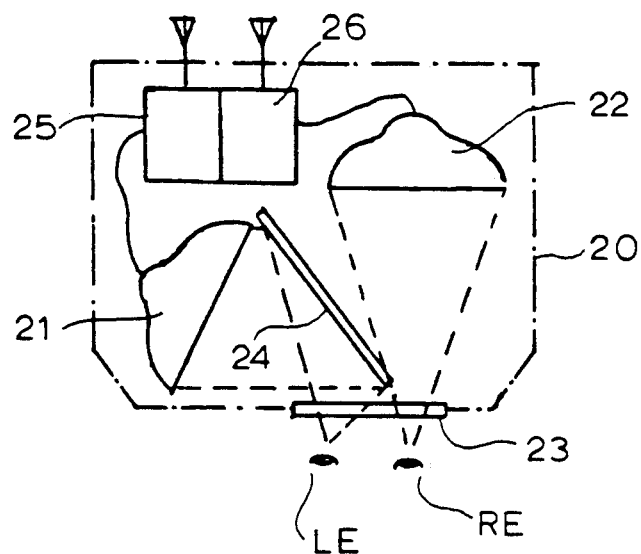
FIG. 1 is a top plan view of a preferred embodiment of the monoscopic and/or stereoscopic television device of the present invention.

A preferred embodiment of the invention is illustrated in FIG. 1. This embodiment includes an apparatus having a frame 20 which has a pair of CRT's 21 and 22 or LCD's both of 12" size. A looking glass 23 is arranged approximately 30 cm. from CRT 22. The other CRT 21 is arranged at an angle relative to the first CRT 22 and at an angle relative to a mirror 24 which extends from the vertical central plane of the CRT 22. This vertical central plane of the CRT is also a central plane for the looking glass 23. The mirror is angled towards CRT 21 to enable the image of CRT 21 to be reflected towards the left eye LE of a viewer. The right eye RE will observe the image presented by CRT 22.

Each CRT is connected to TV-circuitry 25, 26, respectively the circuitry 25 being modified to provide for a mirror image on the CRT 21.

Figure 2:
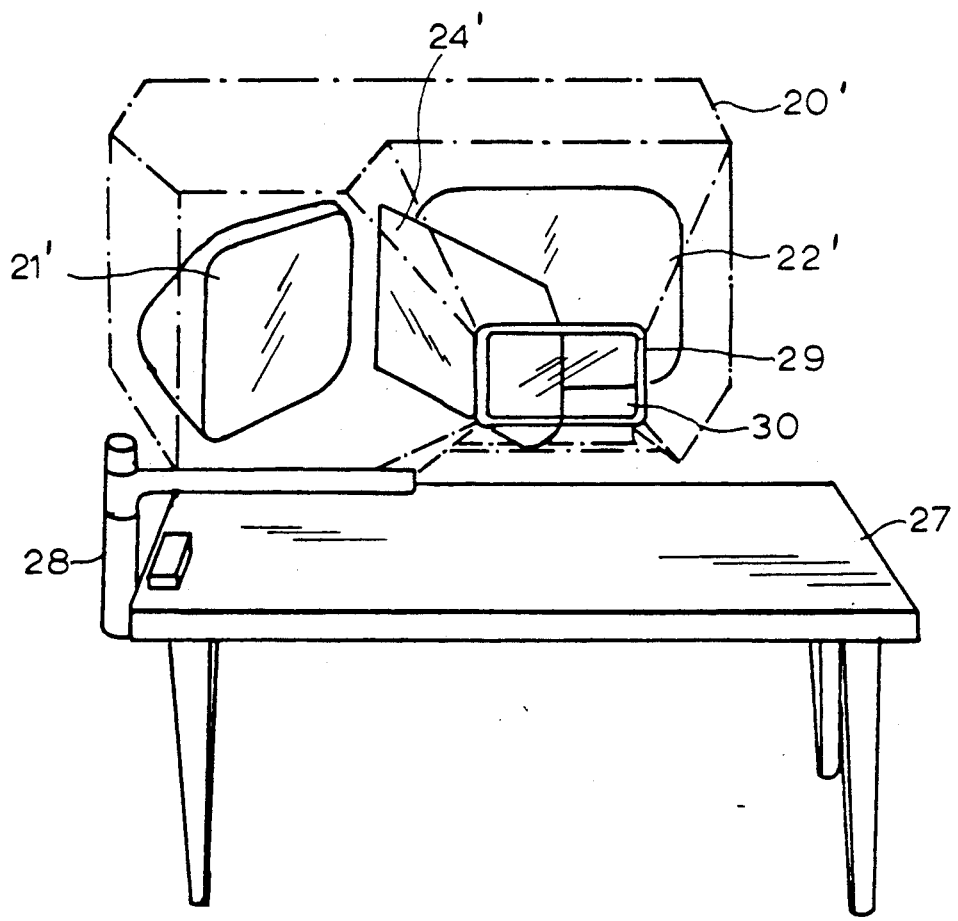
FIG. 2 is a front perspective view of the monoscopic and/or stereoscopic television device of FIG. 1.

The operation of a working embodiment of the second embodiment is illustrated in FIG. 2. In FIG. 2, a solid frame 20' is placed on table 27 by using a wearing arm 28 and is provided with an aperture 29 wherein the looking glass is positioned. Two CRTs 21' and 22' are mounted inside and on the bottom of the frame 20' and arranged as illustrated in FIG. 1. A surface silverized mirror 24' with a sharp image separating edge towards the looking glass 30 is arranged as in FIG. 1. As is shown in FIG. 1, TV circuitry is placed inside and on the bottom of frame 20' (now shown) behind the CRT's.

When the user looks into the looking glass 30, the viewer's left eye will receive the display reflected by mirror 24' from CRT 21' whereas the right eye will receive the display directly from the CRT 22'. Thus, the viewer will obtain a stereoscopic effect directly from the self-contained television device itself.

While the present invention has been particularly shown and described with reference to a preferred embodiment, it will be readily appreciated by those of ordinary skill in the art that various changes and modifications may be made without departing from the spirit and scope of the invention. For instance, as an alternative embodiment to display units based on liquid crystal display units or units based on cathode ray tubes, light emitting diodes, or other types, may be used. As an alternative or supplement to optical means, using lenses, various traditional mirror arrangements in front of the eyes may be used to produce the images separately for each eye. This can be necessary when using only one display unit for the display of both images, or as shown in FIGS. 1 and 2, when other sizes of the display units are used. Furthermore, the embodiment as shown on FIG. 1 and 2 may be powered from the main grid via a connecting power cable (not shown) as common with domestic TV receiver sets or by means of an internal power pack, preferably in the form of batteries known per se and commonly used in portable TV receiver sets based on cathode ray tubes.

In a simplified embodiment of the television apparatus, the tuner part can be omitted. This can be the case when using cables in association with, for instance, portable or stationary playback equipment, video cameras or equipment for image generating. A tuner part can also, if necessary, be placed in a recording/playback equipment.

Signals for images to the left and right eyes may be received on the sam or separate channels or transmitter frequencies.

For the reception and reproduction of sound, in mono or in stereo, the same highly integrated circuits as for the video images may be used. Sound may also be transmitted to a set of earphones. The front of the device may also consist of solar cells for supplying power for operation of the device.

It is intended that the appended claims be interpreted as including the foregoing as well as various other changes and modifications.

What is claimed is:

1. A self-contained television or monitor device for the display of monoscopic and/or stereoscopic images in pairs, comprising a frame, a receiver unit including integrated circuits for the reception and/or generation and distribution of video signals corresponding to said images and including means for the reproduction of sound in mono or stereo, and a display unit including optical means, adapted to produce one image for each eye of a human being, said receiver and display units being assembled and mounted in said frame, said frame being adapted to be placed in sufficiently close proximity to the eyes to enable separate display of each image for each eye without the necessity of any additional interconnecting cables or units outside said frame.

* * * * *